(12) United States Patent
Okada et al.

(10) Patent No.: US 6,915,690 B2
(45) Date of Patent: Jul. 12, 2005

(54) FUEL GAUGE

(75) Inventors: Hiroshi Okada, Gunma (JP); Masato Kumagai, Saitama (JP)

(73) Assignee: Hitachi Unisia Automotive, Ltd., Kanagawa (JP)

( * ) Notice: Subject to any disclaimer, the term of this patent is extended or adjusted under 35 U.S.C. 154(b) by 0 days.

(21) Appl. No.: 10/833,320

(22) Filed: Apr. 28, 2004

(65) Prior Publication Data

US 2004/0231415 A1 Nov. 25, 2004

(30) Foreign Application Priority Data

May 23, 2003 (JP) ........................................ 2003-146247

(51) Int. Cl.[7] .................. G01F 23/32; G01F 23/30; G08B 21/00

(52) U.S. Cl. .................. 73/290 R; 73/317; 73/314; 340/625

(58) Field of Search ................ 73/322.5, 305, 73/317, 319, 314, 313; 340/623, 625; 324/207.2

(56) References Cited

U.S. PATENT DOCUMENTS

2004/0074297 A1   4/2004   Koichi

FOREIGN PATENT DOCUMENTS

| DE | 41 29 060 A | 3/1993 | |
|---|---|---|---|
| DE | 199 25 185 A | 12/2000 | |
| DE | 299 16 121 U | 2/2001 | |
| JP | 9-126080 A | 5/1997 | |
| JP | 2002206945 A | * 7/2002 | ............ G01D/5/12 |
| JP | 2002206959 A | * 7/2002 | ............ G01F/23/38 |
| JP | 2003004508 A | * 1/2003 | ............ G01F/23/38 |
| WO | WO 03/021207 A | 3/2003 | |

OTHER PUBLICATIONS

Patent Abstracts of Japan, vol. 2000, No. 01, Jan. 31, 2000 and JP 11 281 466 A (Yazaki Corp. Oct. 15, 1999).

Patent Abstracts of Japan vol. 1996, No. 08, Aug. 30, 1996 and JP 8 094413 A (Nippon Biniron KK), Apr. 12, 1996.

* cited by examiner

Primary Examiner—Hezron Williams
Assistant Examiner—Tamiko Bellamy
(74) Attorney, Agent, or Firm—Sughrue Mion, PLLC

(57) ABSTRACT

A fuel gauge includes an arm moving with the level of fuel in a fuel tank, a detection body for movably supporting the arm and including a rotor moving together with the arm and a stator for movably supporting the rotor, and a magnetic-flux detecting element arranged in the stator and for detecting the displacement amount of the arm.

9 Claims, 7 Drawing Sheets

FUEL GAUGE

BACKGROUND OF THE INVENTION

The present invention relates to a fuel gauge for detecting the remaining amount of fuel in the fuel tank.

Various fuel gauges are available for detection of the remaining amount of fuel in the fuel tank. JP-A 9-126080 discloses a fuel pump device provided with a fuel gauge. This fuel gauge is arranged in a fuel tank, and comprises a float with an arm moving vertically with the level of fuel in the fuel tank, and a detection body to which a base end of the arm of the float is supported vertically movably and for detecting the vertical displacement amount of the arm. The detection body comprises a permanent magnet fixed to the base end of the arm for vertical movement therewith and a magnetic-flux detecting element or non-contact detecting element arranged in a position opposite to the permanent magnet. The magnetic-flux detecting element is disposed to face a chamber in which the arm and the permanent magnet move vertically.

With the above structure, when the level of fuel in the fuel tank is displaced, the float moves vertically therewith. And the magnetic-flux detecting element detects the vertical displacement of the arm of the float.

With the fuel gauge disclosed in JP-A 9-126080, however, the magnetic-flux detecting element is placed in fuel and/or fuel vapor, having possible deterioration.

Moreover, when failing to be arranged in a predetermined position opposite to the permanent magnet, the magnetic-flux detecting element is lowered in output accuracy. However, no consideration is given to positioning of the permanent magnet and the magnetic-flux detecting element.

SUMMARY OF THE INVENTION

It is, therefore, an object of the present invention to provide a fuel gauge which allows prevention of deterioration of the non-contact detecting element and stabilization of the output accuracy thereof.

The present invention provides generally a fuel gauge, which comprises: an arm which moves with a level of fuel in a tank; a detection body which movably supports the arm, the detection body comprising a moving member which moves together with the arm and a stationary member which movably supports the moving member; and a non-contact detecting element arranged in the stationary member of the detection body, the non-contact detecting element detecting the displacement amount of the arm.

BRIEF DESCRIPTION OF THE DRAWINGS

The other objects and features of the present invention will become apparent from the following description with reference to the accompanying drawings, wherein.

DETAILED DESCRIPTION OF THE INVENTION

Figure 1:
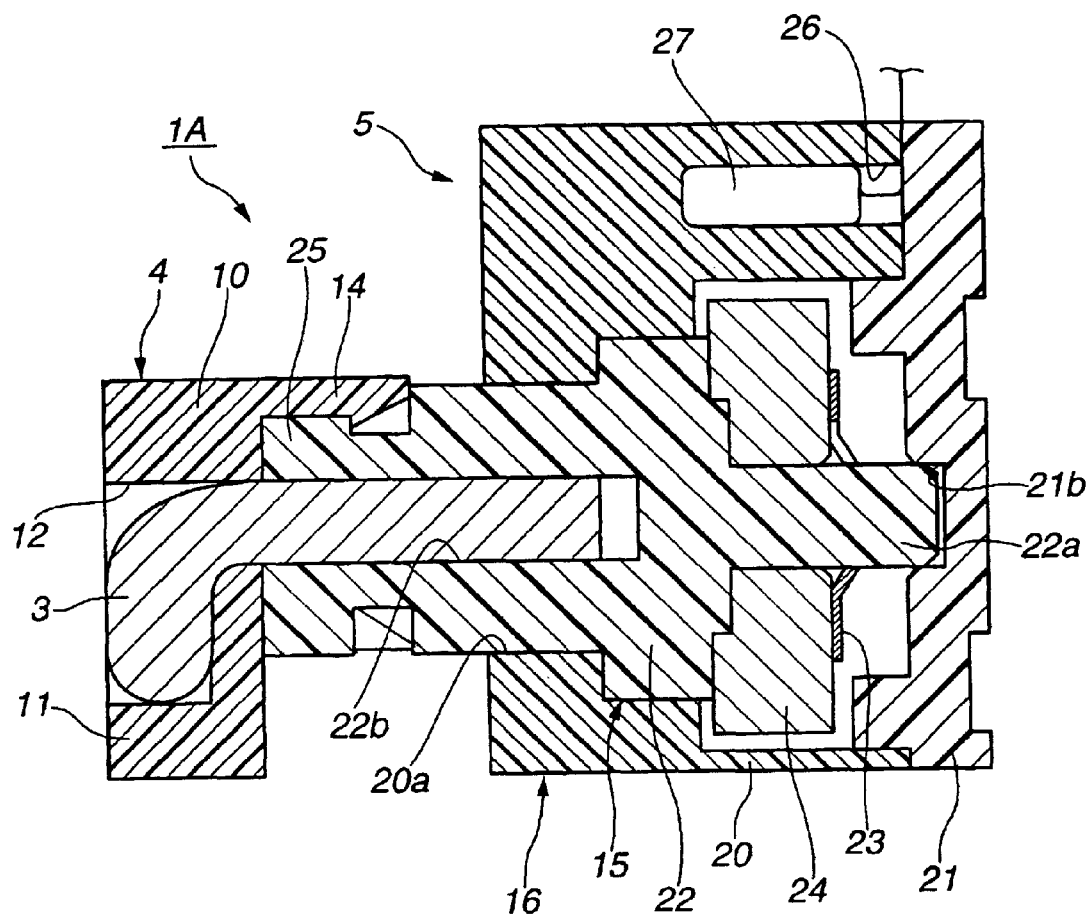
FIG. 1 is a sectional view showing a first embodiment of a fuel gauge according to the present invention.

Referring to the drawings wherein like references designate like parts throughout the views, a fuel gauge embodying the present invention will be described.

Figure 2:
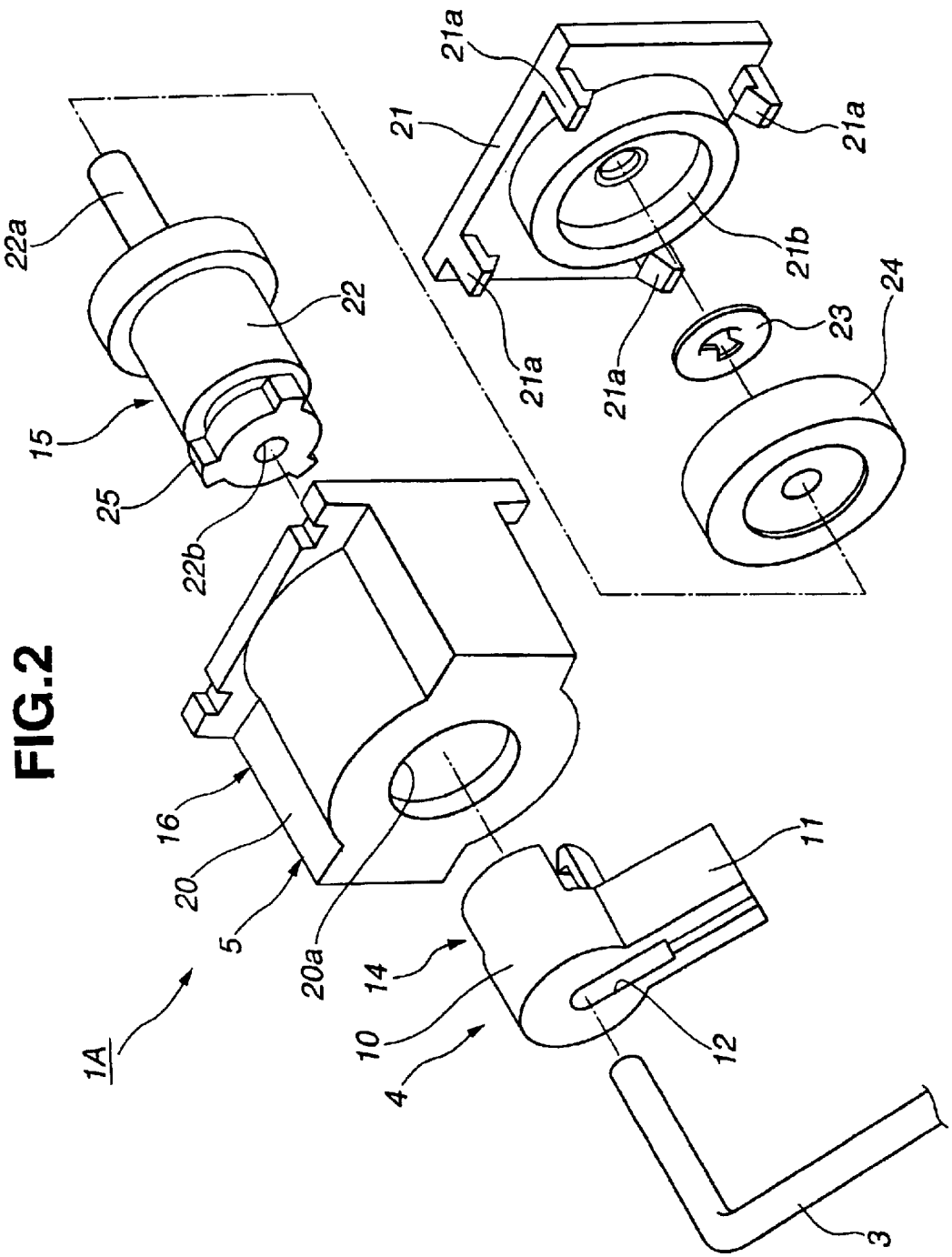
FIG. 2 is an exploded perspective view showing the fuel gauge.
Figure 3:
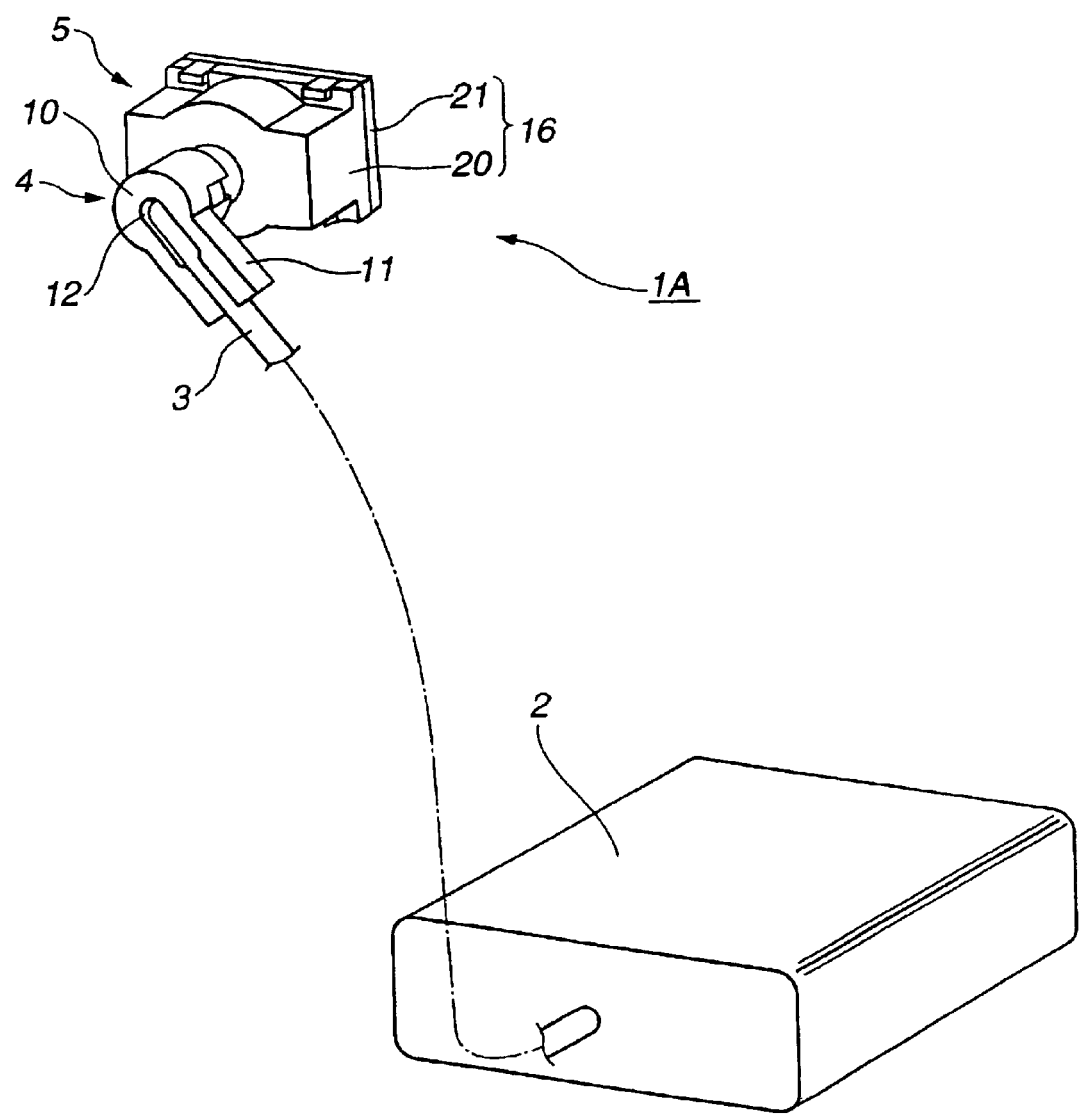
FIG. 3 is a perspective view showing the fuel gauge.

Referring to FIGS. 1–3, there is shown first embodiment of the present invention. Referring to FIG. 3, a fuel gauge 1A comprises a float 2 moving vertically with the level of fuel in a fuel tank, not shown, an arm 3 having a free end to which float 2 is supported rotatably, and a detection body 5 to which a base end of arm 3 is rotatably supported through an arm holder 4. Detection body 5 is fixed on the inner wall of the fuel tank, and float 2 is disposed in the fuel tank to float on the surface of fuel accumulated therein.

Referring to FIGS. 1 and 2, arm holder 4 comprises a cylindrical portion 10 and a holder-arm portion 11 integrated therewith and extending from the outer periphery of cylindrical portion 10 in the radial direction, i.e. the direction orthogonal to the axial direction. Cylindrical portion 10 and arm-holder portion 11 are formed with an arm fixing hole 12 having dimension roughly equal to or slightly smaller than the outer diameter of arm 3. With the base end of arm 3 inserted into arm fixing hole 12, arm 3 is fixed to arm holder 4. A tip of the base end of arm 3 protrudes from the front-end face of cylindrical portion 10 of arm holder 4.

A holder-side engagement 14 is provided to a front end of cylindrical portion 10 of arm holder 4. Detection body 5 comprises a rotor or moving member 15 to which the base end of arm 3 is supported and which rotates together with arm 3, and a stator or stationary member 16 for rotatably supporting rotor 15.

Stator 16 comprises a casing body 20 of synthetic resin and a lid 21 of synthetic resin latched to casing body 20 by latching pawls 21a, and has rotor 15 rotatably supported therein. Rotor 15 comprises a rotation shaft 22 having multi-step cylindrical shape and a magnet 24 arranged through a small-diameter portion 22a of rotation shaft 22 and retained by a snap ring 23 for anti-disengagement.

Rotation shaft 22 has both sides supported by a shaft support hole 20a of casing body 20 and a shaft support groove 21b of lid 21, respectively. An arm insertion hole 22b is axially formed through rotation shaft 22, and opens to the front-end face of rotation shaft 22. The base end of arm 3 is inserted into arm insertion hole 22b. A detection-side engagement 25 is arranged at a front end of rotation shaft 22 to protrude outward from shaft support hole 20a of casing body 20. By engaging holder-side engagement 14 with detection-side engagement 25, the base end of arm 3 is fixed to rotor 15 with axial and circumferential movements prevented.

N and S poles are alternately arranged on the outer peripheral surface of magnet 24 along the circumferential direction. An element compartment 26 is formed in casing body 20 to directly accommodate a magnetic-flux detecting element or non-contact detecting element 27. Element compartment 26 is designed so that when accommodated in the innermost position of element compartment 26, magnetic-flux detecting element 27 is located in a predetermined position opposite to the outer periphery of magnet 24. Element compartment 26 has one end with an opening for receiving magnetic-flux detecting element 27, which is closed by lid 21. In such a way, magnetic-flux detecting element 27 is hermetically disposed in casing body 20.

Magnetic-flux detecting element 27 generates a voltage in response to a change in magnetic field of magnet 24 to output rotation-angle information.

With the above structure, fuel and/or fuel vapor does not enter stator 16 up to a position of magnetic-flux detecting element 27, allowing prevention of deterioration of magnetic-flux detecting element 27 by fuel and/or fuel vapor. Moreover, magnetic-flux detecting element 27 is disposed in stator 16 which serves to position rotor 15, achieving accurate positioning of magnetic-flux detecting element 27 and rotor 15, allowing stabilization of the output accuracy of magnetic-flux detecting element 27.

In the first embodiment, magnetic-flux detecting element 27 is directly hermetically disposed in stator 16, allowing manufacturing of stator 16 with built-in magnetic-flux detecting element 27 at low cost.

In the first embodiment, the non-contact detecting element includes magnetic-flux detecting element 27. Optionally, it may include other element which can detect the angle of rotation of rotor 15 in a non-contact way.

In the first embodiment, the base end of arm 3 is rotatably supported by detection body 5, allowing detection of a variation in fuel level in the form of conversion into angle of rotation, resulting in a reduction in mounting space of detection body 5.

Figure 4:
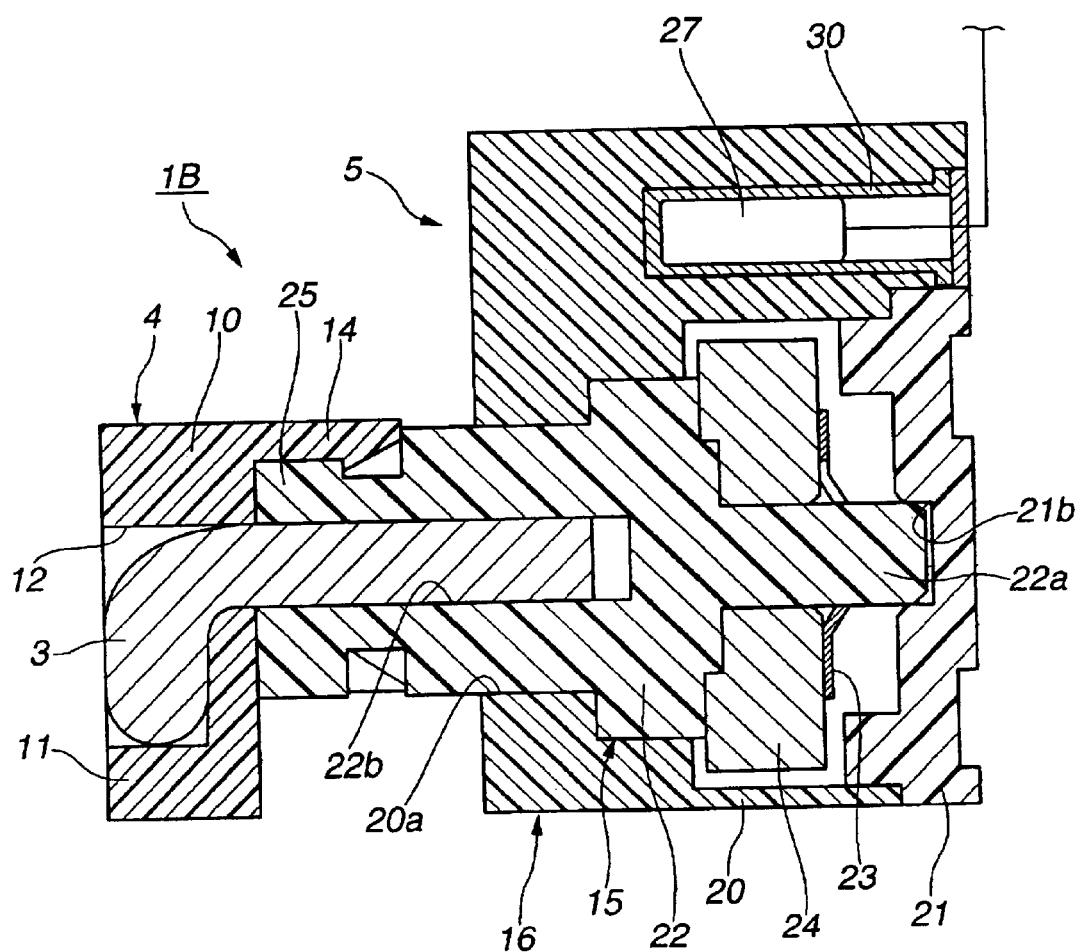
FIG. 4 is a view similar to FIG. 1, showing a second embodiment of the present invention.

Referring to FIG. 4, there is shown second embodiment of the present invention which is substantially the same as the first embodiment. A fuel gauge 1B in the second embodiment differs from fuel gauge 1A in the first embodiment in that magnetic-flux detecting element 27 is hermetically disposed in casing body 20 in the state of being accommodated in a closed box 30. Closed box 30 is integrally formed with casing body 20 by insert resin molding. Then, magnetic-flux detecting element 27 is accommodated in closed box 30 to achieve casing body 20 with built-in magnetic-flux detecting element 27.

In the second embodiment, in the same way as in the first embodiment, fuel and/or fuel vapor does not enter stator 16 up to a position of magnetic-flux detecting element 27, allowing prevention of deterioration of magnetic-flux detecting element 27 by fuel and/or fuel vapor. Moreover, magnetic-flux detecting element 27 is disposed in stator 16 which serves to position rotor 15, achieving accurate positioning of magnetic-flux detecting element 27 and rotor 15, allowing stabilization of the output accuracy of magnetic-flux detecting element 27.

In the second embodiment, magnetic-flux detecting element 27 is disposed in stator 16 in the state of being accommodated in closed box 30, allowing enhancement in hermeticity of magnetic-flux detecting element 27, resulting in surer prevention of deterioration thereof by fuel and/or fuel vapor.

Figure 5:
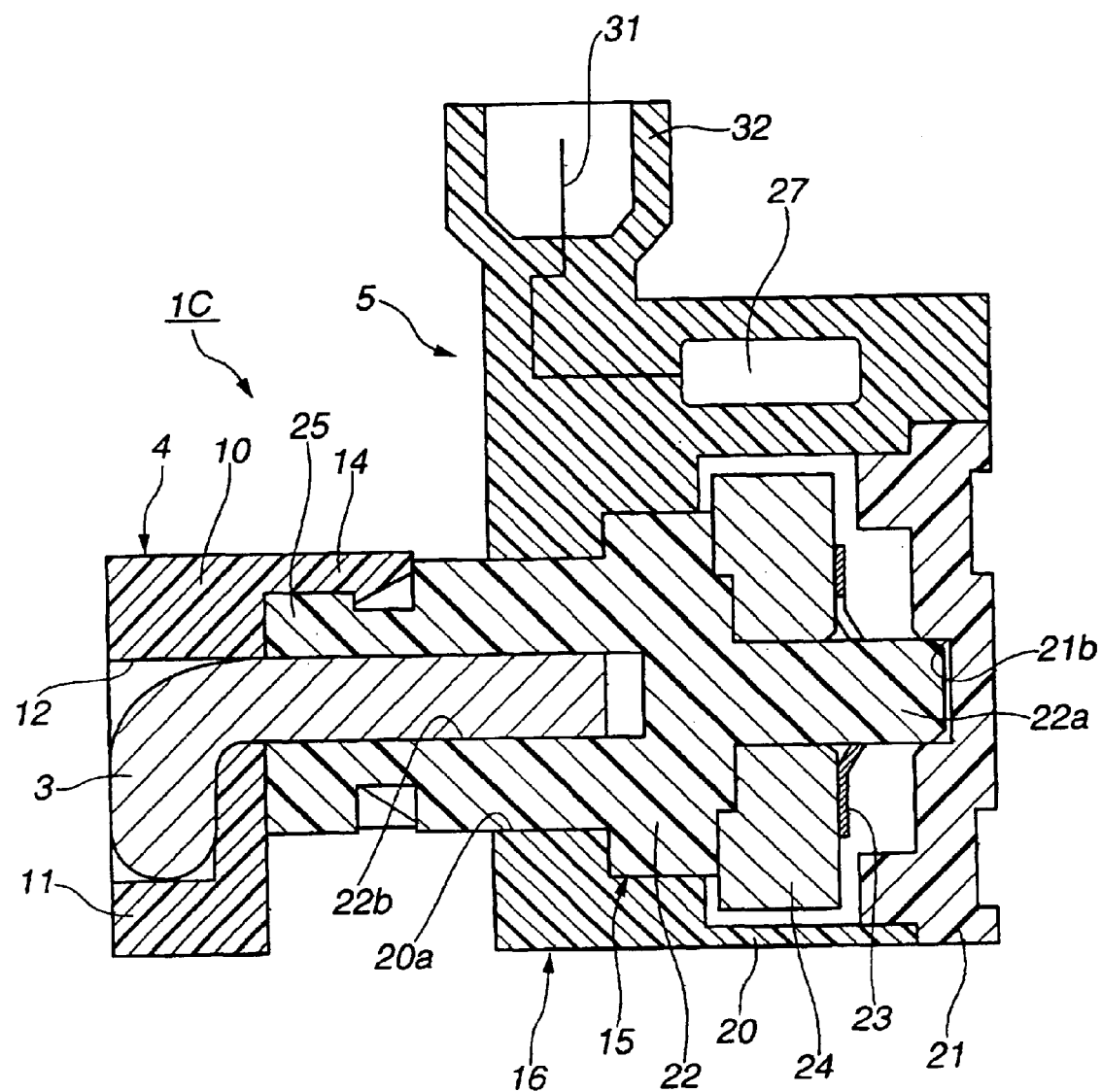
FIG. 5 is a view similar to FIG. 4, showing a third embodiment of the present invention.

Referring to FIG. 5, there is shown third embodiment of the present invention which is substantially the same as the first embodiment. A fuel gauge 1C in the third embodiment differs from fuel gauge 1A in the first embodiment in that magnetic-flux detecting element 27 is hermetically disposed in casing body 20 through its integral formation with casing body 20 by insert resin molding.

Moreover, a connector pin 31 is formed with magnetic-flux detecting element 27 by insert resin molding, and a connector portion 32 is integrally formed with casing body 20. By connecting connector portion 32 to a counter-connector, not shown, electric connection can be ensured between magnetic-flux detecting element 27 and the outside.

The third embodiment produces the same effect as that of the first embodiment. Additionally, presence of connector portion 32 facilitates electric connection between magnetic-flux detecting element 27 and the outside.

Figure 6:
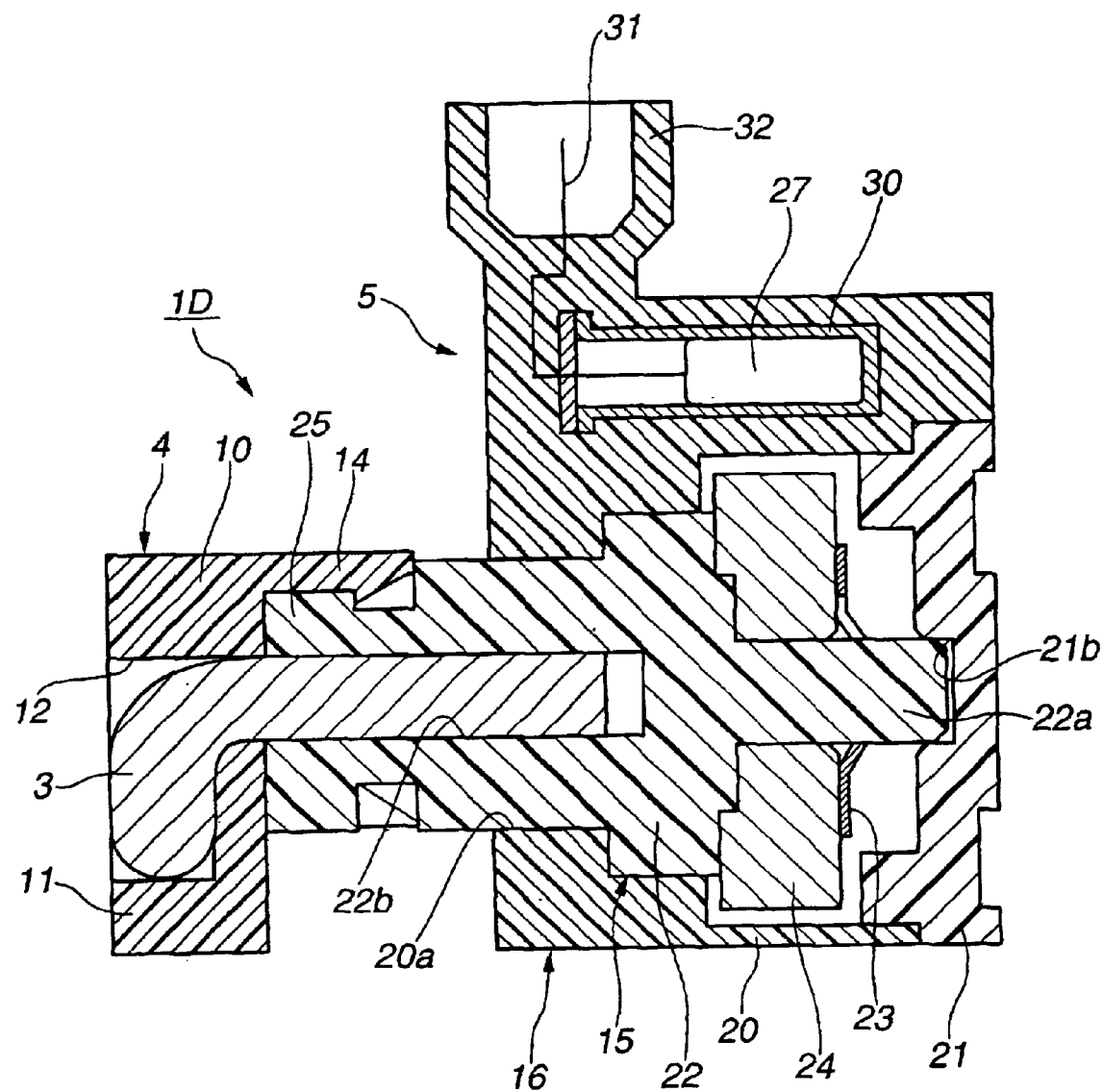
FIG. 6 is a view similar to FIG. 5, showing a fourth embodiment of the present invention.

Referring to FIG. 6, there is shown fourth embodiment of the present invention which is substantially the same as the second embodiment. A fuel gauge 1D in the fourth embodiment differs from fuel gauge 1B in the second embodiment in that magnetic-flux detecting element 27 is hermetically disposed in casing body 20 through its integral formation, together with closed box 30, with casing body 20 by insert resin molding. All the periphery of closed box 30 is covered with synthetic resin of casing body 20.

Moreover, connector pin 31 is formed with magnetic-flux detecting element 27 and closed box 30 by insert resin molding, and connector portion 32 is integrally formed with casing body 20. By connecting connector portion 32 to a counter-connector, not shown, electric connection can be ensured between magnetic-flux detecting element 27 and the outside.

The fourth embodiment produces the same effect as that of the second embodiment. Additionally, presence of connector portion 32 facilitates electric connection between magnetic-flux detecting element 27 and the outside.

Moreover, in the fourth embodiment, magnetic-flux detecting element 27 is protected from heat, vibrations, and the like by closed box 30 during manufacturing of casing body 20, allowing enhancement in reliability of magnetic-flux detecting element 27.

Figure 7:
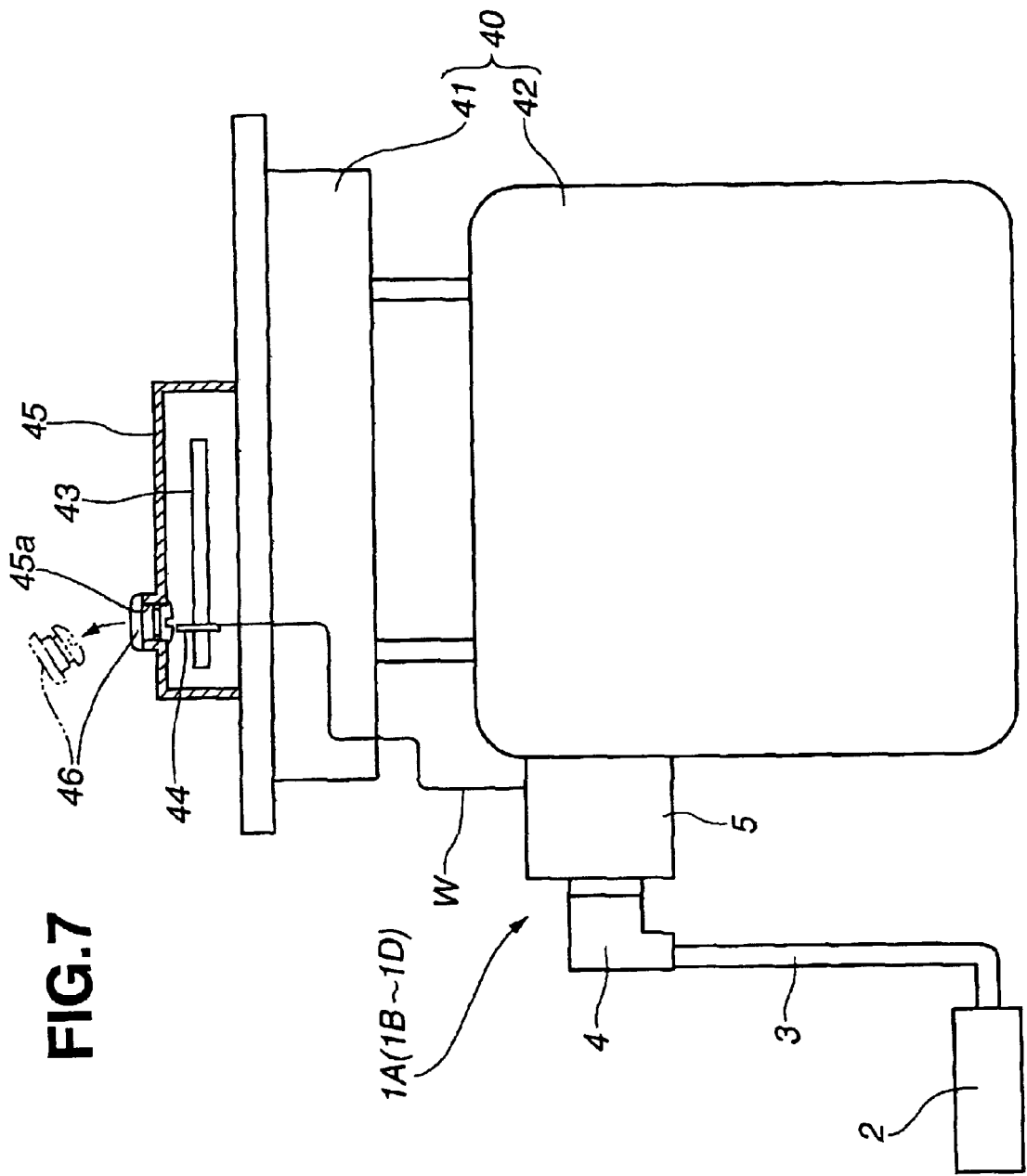
FIG. 7 is a plan view showing an example of mounting conditions of the fuel gauge in the embodiments.

Referring next to FIG. 7, an example of in-tank mounting conditions of fuel gauges 1A to 1D in the first to fourth embodiments will be described.

Referring to FIG. 7, a fuel-pump unit 40 is arranged in a fuel tank, not shown, and comprises a bracket 41 fixed to an upper lid, not shown, of the fuel tank and a pump body 42 coupled to the underside of bracket 41. With only the upside of bracket 41 exposed to the outside of the fuel tank, all the periphery of pump body 42 is located in the fuel tank. Detection body 5 of fuel gauge 1A (1B–1D) is fixed on the outer peripheral surface of pump body 42 disposed in the fuel tank.

An electronic substrate 43 having circuits for pump control and the like mounted thereon is arranged on the upside of bracket 41. Output of magnetic-flux detecting element 27 is provided to a probe pin 44 of electronic substrate 43 through an electric wire W. Electronic substrate 43 is enclosed with a casing 45 which has an opening 45a formed in a position above probe pin 44. A lid 46 is detachably attached to opening 45a.

After arranging fuel gauge 1A (1B–1D) in the fuel tank, output of magnetic-flux detecting element 27 can be taken out from probe pin 44 through opening 45a with lid 46 removed therefrom. This allows adjustment of output of magnetic-flux detecting element 27 after arranging fuel gauge 1A (1B–1D) in the fuel tank. After output adjustment, opening 45a is closed with lid 46 to isolate the inside of casing 45 having electronic substrate 43 from the outside. With this, dust, water, and the like can be prevented from entering casing 45 from the outside at all times except when carrying out output adjustment.

Having described the present invention in connection with the illustrative embodiment, it is noted that the present invention is not limited thereto, and various changes and modifications can be made without departing from the scope of the present invention.

In the illustrative embodiments, arm 3 is rotatably supported by detection body 5, wherein the angle of rotation of arm 3 is sensed by magnetic-flux detecting element 27. Optionally, arm 3 may be mounted to a vertically moving member of detection body 5 as in the related art, wherein the vertical displacement amount of arm 3 is sensed by the magnetic-flux detecting element. Such structure provides an advantage of allowing detection of fuel-level variation without being converted into the angle of rotation.

Further, in the illustrative embodiments, the base end of arm 3 and rotor 15 of detection body 5 are formed of separate and distinct members. Optionally, they may be formed of an integrated member.

As described above, according to the present invention, fuel and/or fuel vapor does not enter the stationary member up to a position of the non-contact detecting element, allowing prevention of deterioration of the non-contact detecting element by fuel and/or fuel vapor. Moreover, the non-contact detecting element is disposed in the stationary member which serves to position the moving member, achieving accurate positioning of the non-contact detecting element and the moving member, allowing stabilization of the output accuracy of the non-contact detecting element.

Further, according to the present invention, the stationary member with built-in non-contact detecting element can be manufactured at low cost.

Still further, according to the present invention, due to arrangement of the box, enhancement can be achieved in hermeticity of the non-contact detecting element, resulting in sure prevention of deterioration thereof by fuel and/or fuel vapor. Moreover, when the non-contact detecting element and the box are both built in the stationary member during manufacturing of the stationary member, the non-contact detecting element is protected from heat, vibrations, and the like by the box during manufacturing of the stationary member, allowing enhancement in reliability of the non-contact detecting element.

Still further, according to the present invention, due to application of insert resin molding, easy formation of the non-contact detecting element and the box is ensured.

Furthermore, according to the present invention, since the non-contact detecting element includes magnetic-flux detecting element, output of the non-contact detecting element can be adjusted after arranging the fuel gauge in the tank.

Further, according to the present invention, by connecting the connector to a counter-connector, electric connection can be ensured between the non-contact detecting element and the outside.

Still further, according to the present invention, except when output of the non-contact detecting element is adjusted, the opening of the casing is closed with the lid to isolate the inside of the casing from the outside. Thus, dust, water, and the like can be prevented from entering the casing from the outside at all times except when carrying out output adjustment.

Further, according to the present invention, since detection of fuel-level variation can be made in the form of conversion into angle of rotation, resulting in a reduction in mounting space of the detection body.

Furthermore, according to the present invention, detection of fuel-level variation can be made without being converted into angle of rotation.

The entire teachings of Japanese Patent Application P2003-146247 filed May 23, 2004 are hereby incorporated by reference.

What is claimed is:

1. A fuel gauge, comprising:
   an arm which moves with a level of fuel in a tank;
   a detection body which movably supports the arm, the detection body comprising a moving member, which moves together with the arm, and a stationary member which movably supports the moving member; and
   a non-contact detecting element arranged in the stationary member of the detection body, the non-contact detecting element detecting the displacement amount of the arm,
   wherein the non-contact detecting element is directly hermetically arranged in the stationary member of the detection body.

2. A fuel gauge, comprising:
   an arm which moves with a level of fuel in a tank;
   a detection body which movably supports the arm, the detection body comprising a moving member which moves together with the arm and a stationary member which movably supports the moving member; and
   a non-contact detecting element arranged in the stationary member of the detection body, the non-contact detecting element detecting the displacement amount of the arm; and
   a box which accommodates the non-contact detecting element, wherein the non-contact detecting element is hermetically arranged in the stationary member of the detection body in the state of being accommodated in the box.

3. The fuel gauge as claimed in claim 2, wherein at least one of the non-contact detecting element and the box is formed with the stationary member by insert resin molding.

4. The fuel gauge as claimed in claim 1, wherein the non-contact detecting element includes a magnetic-flux detecting element.

5. The fuel gauge as claimed in claim 1, further comprising a connector provided to the stationary member, the connector being connected to the non-contact detecting element.

6. A fuel gauge, comprising:
   an arm which moves with a level of fuel in a tank;
   a detection body which movably supports the arm, the detection body comprising a moving member, which moves together with the arm, and a stationary member which movably supports the moving member; and
   a non-contact detecting element arranged in the stationary member of the detection body, the non-contact detecting element detecting the displacement amount of the arm,
   further comprising a probe pin arranged to protrude outward from the tank, the probe being connected to the non-contact detecting element.

7. The fuel gauge as claimed in claim 6, further comprising a casing for accommodating the probe, the casing having an opening formed in a position corresponding to the probe pin, the opening being closed with a lid.

8. The fuel gauge as claimed in claim 1, wherein the arm is rotatably supported by the detection body.

9. The fuel gauge as claimed in claim 1, wherein the arm has a base end linearly movably supported by the detection body.

* * * * *